(12) United States Patent
Li

(10) Patent No.: US 11,445,255 B2
(45) Date of Patent: Sep. 13, 2022

(54) OPERATION METHOD, DEVICE, APPARATUS AND STORAGE MEDIUM OF PLAYING VIDEO

(71) Applicant: BEIJING XIAOMI MOBILE SOFTWARE CO., LTD., Beijing (CN)

(72) Inventor: Jiayi Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 67 days.

(21) Appl. No.: 16/600,448

(22) Filed: Oct. 12, 2019

(65) Prior Publication Data

US 2020/0195877 A1    Jun. 18, 2020

(30) Foreign Application Priority Data

Dec. 17, 2018    (CN) .................. CN201811545210

(51) Int. Cl.
*H04N 21/47* (2011.01)
*G06F 1/16* (2006.01)
(Continued)

(52) U.S. Cl.
CPC .......... *H04N 21/47* (2013.01); *G06F 1/1641* (2013.01); *G06F 3/04886* (2013.01);
(Continued)

(58) Field of Classification Search
CPC ... H04N 21/431–4318; H04N 21/4316; H04N 21/47–4888; H04N 21/4788;
(Continued)

(56) References Cited

U.S. PATENT DOCUMENTS 8,736,561 B2 * 5/2014 Anzures .............. G06F 3/04883
345/173
9,043,714 B1 * 5/2015 Queru ................. A63F 13/2145
715/765
(Continued)

FOREIGN PATENT DOCUMENTS

CN    107728901 A    2/2018
EP    3098802 A1    11/2016
(Continued)

OTHER PUBLICATIONS

Extended European Search Report of European Patent Application No. 19206102.6 dated Apr. 28, 2020.
(Continued)

*Primary Examiner* — Liang Y Li
(74) *Attorney, Agent, or Firm* — Syncoda LLC; Feng Ma

(57) ABSTRACT

A method of playing a video, applied to a terminal having a foldable display screen, includes: displaying a video playback interface for a target video; determining a video playback area and an auxiliary display area other than the video playback area in an unfolded display area of the foldable display screen according to a video aspect ratio of the target video when the foldable display screen is in an unfolded state; and displaying an auxiliary control related to playing the target video in the auxiliary display area. In the unfolded state, the video playback area for playing the target video is separated from the auxiliary display area for operating the target video, such that the target video can still be played normally when the target video is operated on, thereby allowing the user to perform the operation while watching the video.

6 Claims, 8 Drawing Sheets

(51) Int. Cl.
*G06F 3/04886* (2022.01)
*H04N 21/431* (2011.01)
*H04N 21/422* (2011.01)

(52) U.S. Cl.
CPC ... *H04N 21/42204* (2013.01); *H04N 21/4316* (2013.01); *H04N 21/42208* (2013.01)

(58) Field of Classification Search
CPC .......................... H04N 21/42204–42228; H04N 21/42208–42209; G06F 1/1641; G06F 3/048; G06F 3/04886
See application file for complete search history.

(56) References Cited

U.S. PATENT DOCUMENTS

| | | | | |
|---|---|---|---|---|
| 9,179,116 B1* | 11/2015 | Liao | ................. | H04N 21/47217 |
| 2009/0058884 A1* | 3/2009 | Li | ............................ | G09G 5/14 |
| | | | | 345/660 |
| 2010/0182265 A1* | 7/2010 | Kim | ..................... | G06F 1/1641 |
| | | | | 345/173 |
| 2013/0198661 A1* | 8/2013 | Matas | ..................... | G06F 3/048 |
| | | | | 715/762 |
| 2013/0321340 A1* | 12/2013 | Seo | ........................ | G06F 3/0485 |
| | | | | 345/174 |
| 2014/0372890 A1 | 12/2014 | Qiu | | |
| 2015/0331593 A1 | 11/2015 | Lee et al. | | |
| 2016/0103830 A1* | 4/2016 | Cheong | ................. | G06F 3/0484 |
| | | | | 715/738 |
| 2016/0112667 A1 | 4/2016 | Park et al. | | |
| 2017/0034583 A1* | 2/2017 | Long | ................... | H04N 21/4788 |
| 2019/0182562 A1* | 6/2019 | Peng | ................... | H04N 21/2743 |
| 2019/0324612 A1* | 10/2019 | Du | ..................... | H04N 21/4882 |

FOREIGN PATENT DOCUMENTS

EP          3182245 A1     6/2017
KR        20160080049 A   7/2016

OTHER PUBLICATIONS

CN 1st Office Action in Application No. 201811545210.3, dated Sep. 3, 2020.

* cited by examiner

OPERATION METHOD, DEVICE, APPARATUS AND STORAGE MEDIUM OF PLAYING VIDEO

CROSS-REFERENCE TO RELATED APPLICATIONS

The present application claims the priority to Chinese Patent Application No. 201811545210.3 filed on Dec. 17, 2018, the disclosure of which is hereby incorporated by reference in its entirety.

BACKGROUND

Users can play online videos using their smartphones. During a process of playing the online video, the user can perform at least one of operations of launching a bullet screen, adjusting playback progress, setting playback speed, or sharing the video.

Taking the launching a bullet screen as an example, a button for launching the bullet screen is displayed on a video playback interface of the smartphone. When the button for launching the bullet screen is clicked, the smartphone overlays a virtual keyboard interface on the upper layer of the video playback interface, and the user inputs the content of the bullet screen on the virtual keyboard interface, and then sends the content to a server side of the online video.

SUMMARY

The present application relates generally to the field of multimedia playback, and more specifically to an operation method, device, apparatus and storage medium of playing a video.

Various embodiments of the present disclosure provide an operation method, a device, an apparatus, and a storage medium of playing a video, which can solve a problem that the virtual keyboard interface covers an interface area on the video playback interface by a large area, which affects the user to watch the online video normally. A technical solution is as follows.

According to an aspect of the embodiments of the present application, an operation method of playing a video is provided, which is applied to a terminal having a foldable display screen, the method includes:

displaying a video playback interface for a target video;

determining a video playback area and an auxiliary display area other than the video playback area in an unfolded display area of the foldable display screen according to a video aspect ratio of the target video when the foldable display screen is in an unfolded state; and displaying an auxiliary control related to playing the target video in the auxiliary display area.

In some embodiments, a display resolution in the unfolded display area of the foldable display screen is obtained, wherein the display resolution includes a first resolution of a long side and a second resolution of a short side;

the number of pixels occupied by the video playback area on the short side is calculated according to the video aspect ratio of the target video and the first resolution, wherein the number of pixels is smaller than the second resolution;

the short side is split into a first short side and a second short side according to the number of pixels, and a display area formed by the long side and the first short side is determined as the video playback area, and a display area formed by the long side and the second short side is determined as the auxiliary display area.

In some embodiments, when the foldable display screen is in a folded state, the video playback interface for the target video is displayed on a main display screen of the foldable display screen;

the video playback area and the auxiliary display area other than the video playback area are determined in the unfolded display area of the foldable display screen according to the video aspect ratio of the target video when the foldable display screen is switched from the folded state to the unfolded state.

In an optional implementation manner, an input box for the bullet screen and a virtual keyboard are displayed in the auxiliary display area; the input box for the bullet screen is configured to input a content of the bullet screen corresponding to the target video.

In another optional implementation manner, a playback progress bar of the target video is displayed in the auxiliary display area, and at least one recommended play node is displayed on the playback progress bar;

a video screen preview corresponding to the play node is displayed at a peripheral side of the playback progress bar.

In another optional implementation manner, a shortcut button control is displayed in the auxiliary display area; the shortcut button control includes at least one of a cache button, a projection screen button, a VR button, a button for setting the bullet screen display mode, a small window play button, a screen size button, a timed off button, an automatic skip beginning and ending button, a brightness adjustment button, a multispeed play button, or a share button.

According to another aspect of the embodiment of the present application, an operating device of playing a video is provided, which is applied to a terminal having a foldable display screen, the device includes:

a display module, configured to display a video playback interface for a target video;

a determining module, configured to determine a video playback area and an auxiliary display area other than the video playback area in an unfolded display area of the foldable display screen according to a video aspect ratio of the target video when the foldable display screen is in an unfolded state;

the display module is configured to display an auxiliary control related to playing the target video in the auxiliary display area.

According to another aspect of the embodiment of the present application, an operating device of playing a video is provided, which is applied to a terminal having a foldable display screen, the device includes:

a display module, configured to display a video playback interface for a target video;

a determining module, configured to determine a video playback area and an auxiliary display area other than the video playback area in an unfolded display area of the foldable display screen according to a video aspect ratio of the target video when the foldable display screen is in an unfolded state;

the display module is configured to display an auxiliary control related to playing the target video in the auxiliary display area.

In some embodiments, the determining module includes:

an obtaining unit, configured to obtain a display resolution in the unfolded display area of the foldable display screen, wherein the display resolution includes a first resolution of a long side and a second resolution of a short side;

a calculating unit, configured to calculate the number of pixels occupied by the video playback area on the short side according to the video aspect ratio of the target video and the first resolution, wherein the number of pixels is smaller than the second resolution; and a determining unit, configured to split the short side into a first short side and a second short side according to the number of pixels, and determine a display area formed by the long side and the first short side as the video playback area and determine a display area formed by the long side and the second short side as the auxiliary display area.

In some embodiments, the display module is configured to display the video playback interface for the target video on a main display screen of the foldable display screen when the foldable display screen is in a folded state;

the determining module is configured to determine the video playback area and the auxiliary display area other than the video playback area in the unfolded display area of the foldable display screen according to the video aspect ratio of the target video when the foldable display screen is switched from the folded state to the unfolded state.

In an optional implementation manner, the display module is configured to display an input box for the bullet screen and a virtual keyboard in the auxiliary display area; the input box for the bullet screen is configured to input a content of the bullet screen corresponding to the target video.

In another optional implementation manner, the display module is configured to display a playback progress bar of the target video in the auxiliary display area, and at least one recommended play node is displayed on the playback progress bar;

the display module is configured to display a video screen preview corresponding to the play node at a peripheral side of the playback progress bar.

In another optional implementation manner, the display module is configured to display a shortcut button control in the auxiliary display area; the shortcut button control includes at least one of a cache button, a projection screen button, a VR button, a button for setting the bullet screen display mode, a small window play button, a screen size button, a timed off button, an automatic skip beginning and ending button, a brightness adjustment button, a multispeed play button, or a share button.

According to another aspect of an embodiment of the present disclosure, a terminal is provided, including a processor and a memory, wherein the memory stores at least one instruction, at least one program, a code set, or an instruction set, and the at least one instruction, the at least one program, the code set, or the instruction set instructions is loaded and executed by the processor to implement an operation method of playing a video as described above.

According to another aspect of the embodiment of the present disclosure, a computer readable storage medium is provided, storing at least one instruction, at least one program, a code set, or an instruction set, and the at least one instruction, the at least one program, the code set, or the instruction set instructions is loaded and executed by a processor to implement an operation method of playing a video as described above.

According to another aspect of the embodiment of the present disclosure, a computer program product is provided, in which a computer program is stored, and the computer program is loaded and executed by a processor to implement an operation method of playing a video as described above.

It should be understood that the above general description and the following detailed description are merely illustrative and explanatory and should not be construed as limiting of the disclosure.

BRIEF DESCRIPTION OF THE DRAWINGS

The accompanying drawings here, which are incorporated in the disclosure and constitute a part of the disclosure, show embodiments of the present disclosure and explain the principles of the present disclosure along with the specification.

DETAILED DESCRIPTION

Figure 1:
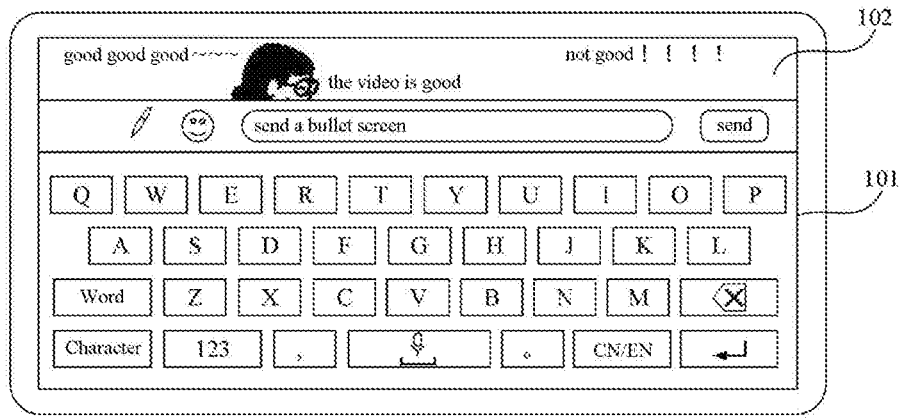
FIG. 1 is a schematic diagram of an interface of inputting a bullet screen according to some embodiments.

Various embodiments will be described in detail herein, examples of which are illustrated in the drawings. When the following description refers to the drawings, the same numbers in different drawings represent the same or similar elements, unless otherwise indicated. The embodiments described in the following exemplary embodiments do not represent all embodiments consistent with the present disclosure. Instead, they are merely examples of devices and methods consistent with aspects of the present disclosure as described in detail in the appended claims.

In the related art, when a user watches a video on a terminal that does not have a foldable display screen, at least one of operations of inputting a bullet screen, dragging a progress bar, and setting a video is performed on the target video through a control on the video playback interface.

The inventor of the present disclosure has recognized that, the virtual keyboard interface may cover an interface area on the video playback interface by a large area, which affects the user to watch the online video normally.

Schematically, as shown in FIG. 1, when the target video is played, the user inputs the content of the bullet screen through the keyboard area 101, and clicks the sending control to complete the operation of inputting the bullet screen. In the embodiment, the video playback interface includes a video playback area 102 for displaying the target video, while the video playback area 102 is covered by the keyboard area 101 by a large area.

Figure 2:
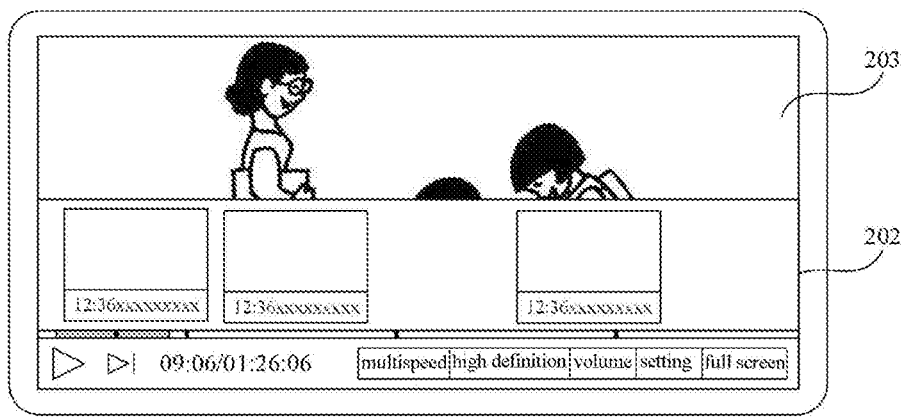
FIG. 2 is a schematic diagram of an interface of dragging progress bar according to some embodiments.

Schematically, as shown in FIG. 2, when the target video is played, the user quickly selects the highlight by dragging the video progress bar 201 to complete the operation of dragging the progress bar. Moreover, the video playback interface includes a video playback area 203 for displaying the target video. When the progress bar 201 is dragged, the video playback area 203 is covered with a small window area 202 located on the peripheral side of the video progress bar 201.

Figure 3:
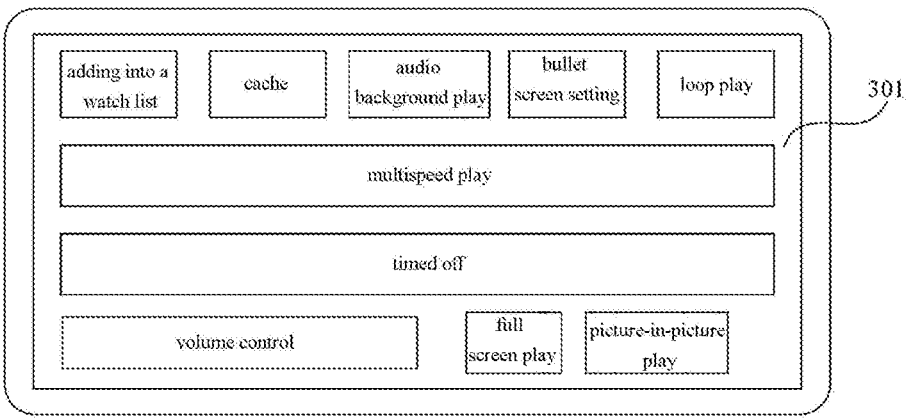
FIG. 3 is a schematic diagram of an interface for setting a video according to some embodiments.

Schematically, as shown in FIG. 3, when the target video is played, the user performs a setting operation on the played target video, and clicks the setting control on the video setting area 301 to complete the setting operation on the played target video. The setting control on the video setting area 301 includes at least one of adding into a watch list, a cache, an audio background play, a bullet screen setting, a loop play, a multispeed play, a timed off, a volume control, a full screen play, and a picture-in-picture play. In the embodiment, the video playback interface includes a video playback area for displaying the target video, the video setting area 301 completely covers on the video playback area, and when the video setting area 301 pops up, the playing target video stops playing until the video setting area 301 is no longer displayed in the video playback interface, then the target video continues to play.

Figure 4:
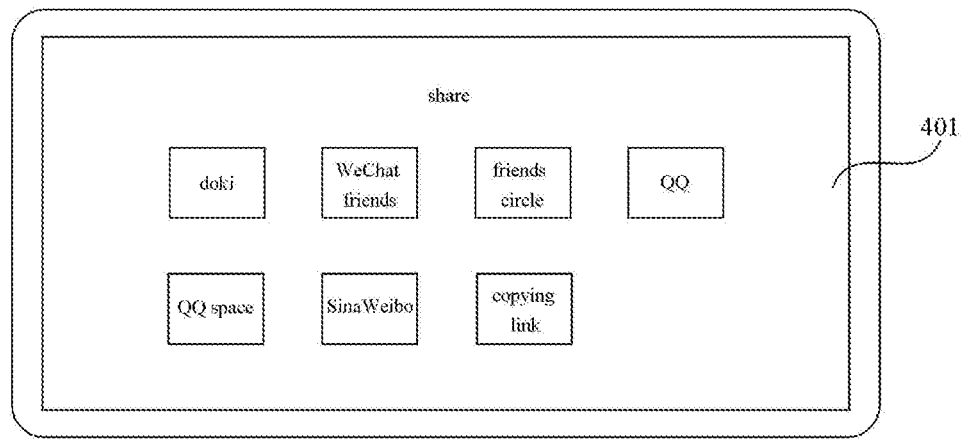
FIG. 4 is a schematic diagram of an interface for setting a video according to some other embodiments.

As shown in FIG. 4, when the target video is played, the user performs a sharing operation on the target video, and clicks the sharing control on the video sharing area 401 to complete the sharing operation on the target video. The sharing control on the video sharing area 401 includes at least one of doki, WeChat friends, friends circle, QQ, QQ space, SinaWeibo, and copying link. In the embodiment, the video playback interface includes a video playback area for displaying the target video, the video sharing area 401 completely covers on the video playback area, and when the video sharing area 401 pops up, the playing target video stops playing until the video sharing area 401 is no longer displayed in the video playback interface, then the target video continues to play.

However, when at least one of operations of inputting a bullet screen, dragging a progress bar, and setting a video is performed on the target video through the above related technology, the pop-up corresponding operation area may completely or by a large area over the video playback area, resulting that the user cannot perform operations while watching the video, which affects the watching effect.

The embodiment of the present application provides an operation method, a device, an apparatus, and a storage medium of playing a video, applied to a terminal having a foldable display screen, which can solve a problem that the user cannot perform operations while watching the video when performing operations on the target video, thereby affecting the watching effect.

An execution subject of each step of the method provided by the embodiment of the present application may be a terminal. The above terminal may be an electronic device such as a mobile phone, a tablet computer, an e-book reader, a multimedia playback device, a wearable device, a laptop portable computer, or the like.

The terminal has a foldable display screen. The foldable display screen is a foldable display screen. In addition to the display capabilities of traditional display screens, the foldable display screen has a foldable feature. The foldable display screen can include two screen states including a folded state and an unfolded state. When the foldable display screen is in the folded state, the space occupied by the terminal can be reduced; when the foldable display screen is in the unfolded state, a larger use area of the display screen can be provided to the user.

In some embodiments, the foldable display screen includes a foldable first screen area and a foldable second screen area. The foldable display screen can be designed as a left and right foldable display screen or a top and bottom foldable display screen, and can also be designed as an outward folding display screen or an inward folding screen display, or a combination of the outward folding display screen and the inward folding display screen, which is not limited by the embodiment of the present application.

In the following, the foldable display screen is designed as a left and right folding display screen as an example to introduce two structural forms of the foldable display screen.

Figure 5:
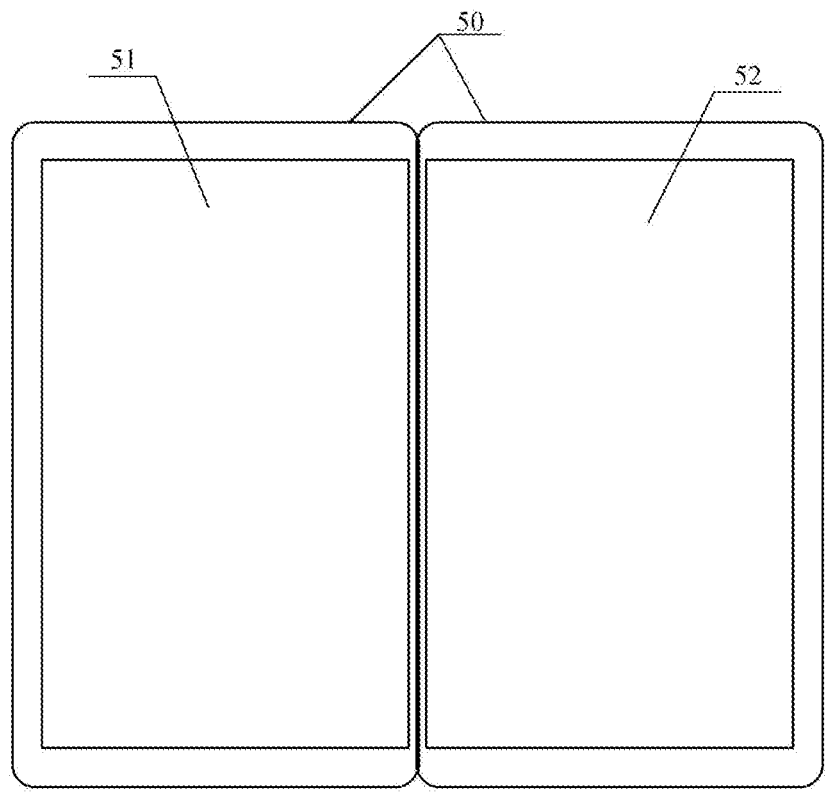
FIG. 5 is a schematic structural diagram showing a terminal having a foldable display screen according to some embodiments.

A first type: as shown in FIG. 5, the first screen area 51 and the second screen area 52 of the foldable display screen 50 are respectively two screens, and the two screens are connected by a connecting mechanism. The above connecting mechanism may be a hinge, a glue, or even a flexible screen, which is not limited by the embodiment of the present application. The attributes, such as the material, the size, and the shape of the two screens, may be the same or different, which is not limited by the embodiment of the present application.

For example, the two screens may be both rigid screens or flexible screens, or one screen may be a rigid screen and the other screen may be a flexible screen. In another example, one of the two screens is larger, which can be used as a main screen, and the other screen is smaller, which can be used as an auxiliary screen. In another example, one of the two screens is thicker and the other is thinner.

A second type: the foldable display screen 50 includes a whole screen, which may be a whole piece of flexible screen, or a screen formed by a seamless combination of a flexible screen and a rigid screen through related manufacture processes.

Figure 6:
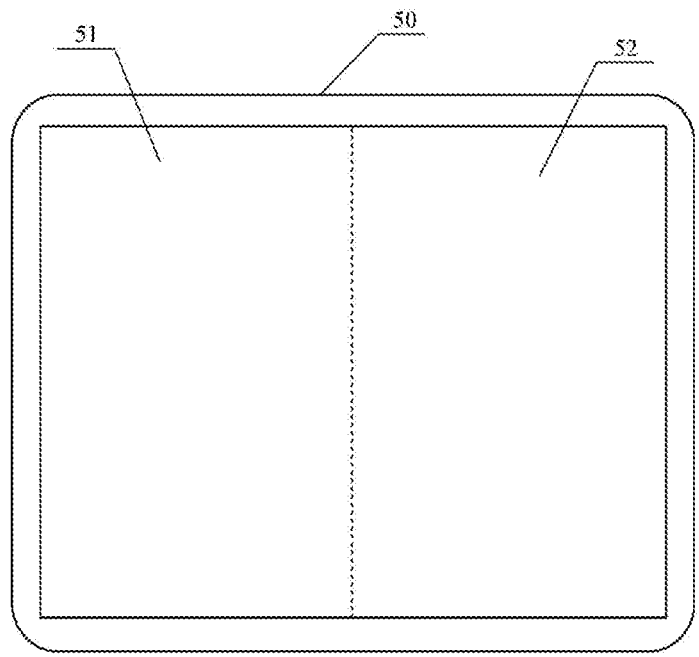
FIG. 6 is a schematic structural diagram showing a terminal having a foldable display screen according to some other embodiments.

As shown in FIG. 6, when the foldable display screen 50 is a whole flexible screen, the foldable display screen 50 can be divided into a first screen area 51 and a second screen area 52, wherein the sizes of the first screen area 51 and the second screen area 52 can be the same or different. At this time, since the foldable display screen 50 is a whole flexible screen, it can be divided into more screen areas in other embodiments.

Figure 7:
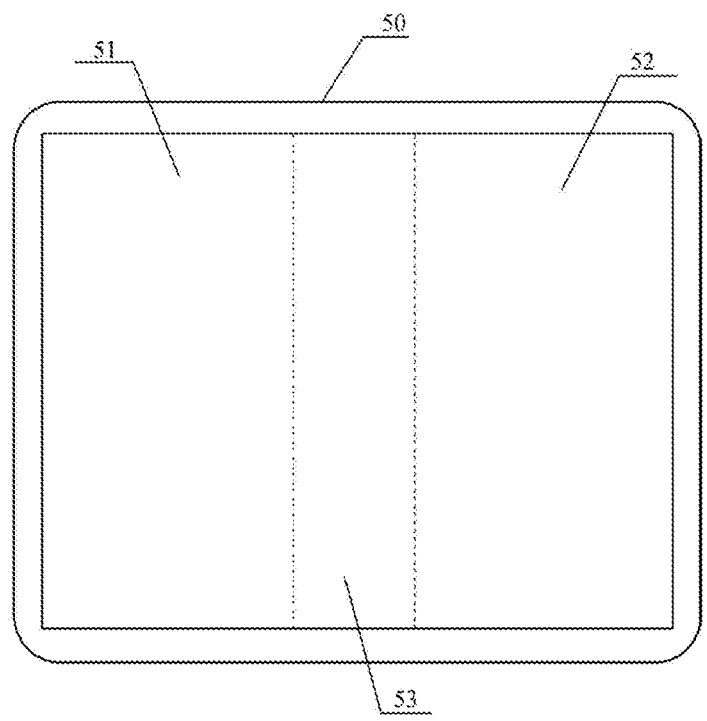
FIG. 7 is a schematic structural diagram showing a terminal having a foldable display screen according to some other embodiments.

As shown in FIG. 7, the foldable display screen 50 is formed by seamlessly splicing a flexible screen and a rigid screen, and the foldable display screen includes a first screen area 51, a second screen area 52, and a third screen area 53. In the embodiment, the third screen area 53 is a flexible screen, and at least one of the first screen area 51 and the second screen area 52 is a rigid screen.

Figure 8:
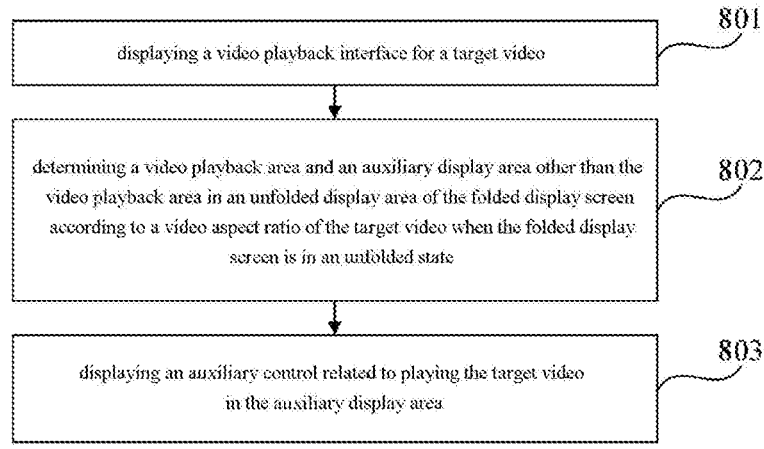
FIG. 8 is a flowchart of an operation method of playing a video according to some embodiments.

FIG. 8 is a flowchart showing an operation method of playing a video according to some embodiments. The method is applied to a terminal having a foldable display screen, and the folding structure of the terminal having the foldable display screen is the structure as shown in FIGS. 5-7. The method includes follows steps.

Step 801, a video playback interface for a target video is displayed.

The terminal enters the video playback interface through the video application on the display screen, and the video playback interface includes a target video playback area and controls for performing some operation on the played target video.

In some embodiments, when the foldable display screen of the terminal is in the folded state, the video playback interface is displayed on at least one screen of the folded plurality of display screens; when the foldable display screen of the terminal is in the unfolded state, the video playback interface is displayed on the screen unfolded into a display screen.

Step 802, when the foldable display screen is in an unfolded state, a video playback area and an auxiliary display area other than the video playback area are determined in an unfolded display area of the foldable display screen according to a video aspect ratio of the target video.

The unfolded display area is the area for displaying the video playback interface on the composite display screen when the foldable display screen is in an unfolded state.

When the foldable display screen is in an unfolded state, a video playback area and an auxiliary display area other than the video playback area are determined in an unfolded display area of the foldable display screen according to a video aspect ratio when playing the target video, for example the video aspect ratio is 16:9.

The video playback area is for playing the target video, and the auxiliary display area includes a control for performing some operation on the played target video, and the auxiliary display area is for performing operations on the played target video.

Step 803, in the auxiliary display area, an auxiliary control related to playing the target video is displayed.

The auxiliary control is used to implement some operation on the played target video, that is, by clicking the auxiliary control in the auxiliary display area, the user realizes some operation on the played target video, such as, at least one of inputting the bullet screen, dragging the progress bar, adjusting video volume, adjusting video brightness, adjusting screen size, video projection screen, video full screen, sharing video, video buffer, video VR playback, small window playback, timed off, automatic skipping starting and ending and multispeed playback.

As such, in the method provided by the embodiment of the present application, when the foldable display screen is in an unfolded state, a video playback area and an auxiliary display area other than the video playback area are determined in an unfolded display area of the foldable display screen according to a video aspect ratio of the target video, and an auxiliary control related to playing the target video is displayed in the auxiliary display area. In the terminal where the foldable display screen is in the unfolded state, the video playback area for playing the target video is separated from the auxiliary display area for performing operations on the target video, so that the target video can still be played normally when the target video is operated, thereby realizing that the user can perform operations while watching the video to ensure the watching effect.

Figure 9:
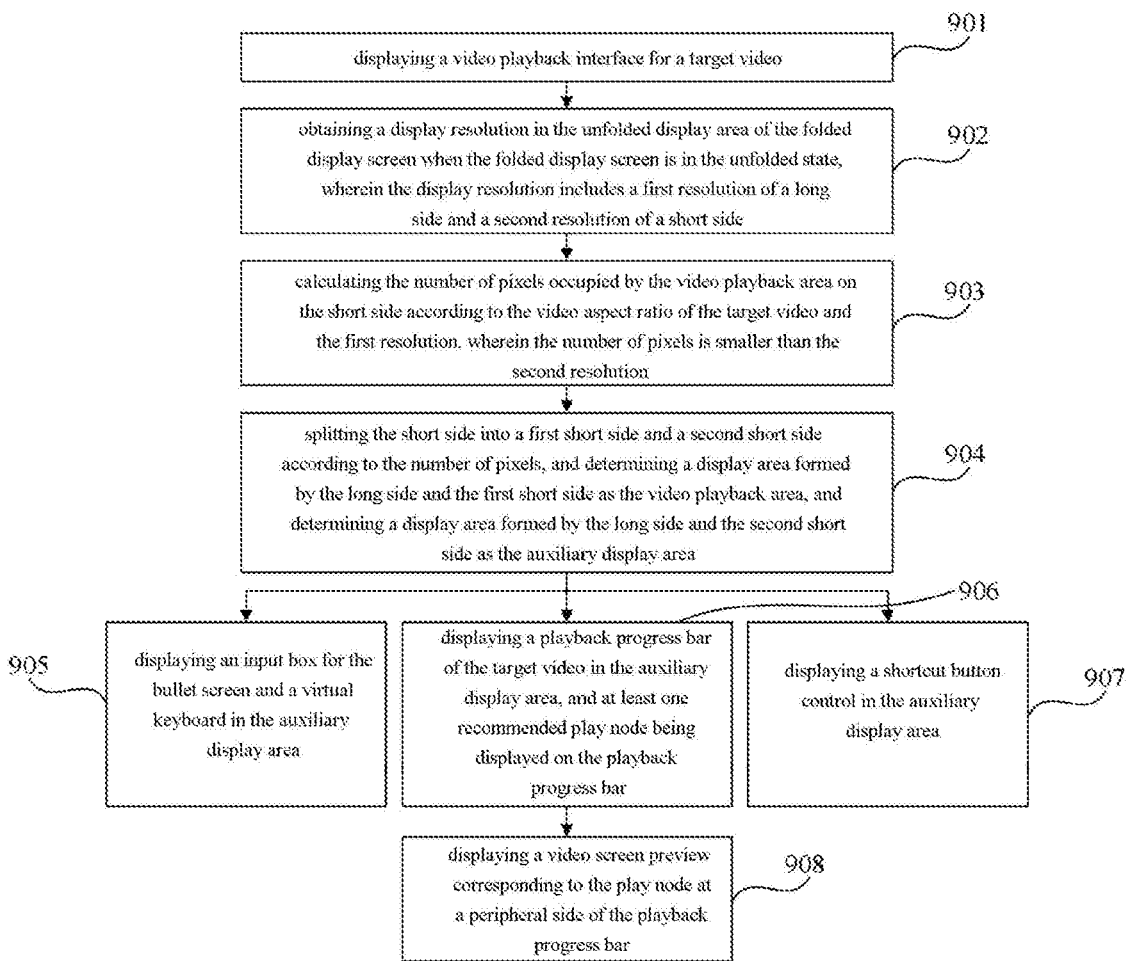
FIG. 9 is a flowchart of an operation method of playing a video according to some other embodiments.

FIG. 9 is a flowchart showing an operation method of playing a video according to some other embodiments. The method is applied to a terminal having a foldable display screen, and the folding structure of the terminal having the foldable display screen is the structure as shown in FIGS. 5-7. The method includes following steps.

Step 901, a video playback interface for a target video is displayed.

The terminal enters the video playback interface through the video application on the display screen, and the video playback interface includes a target video playback area and controls for performing some operation on the played target video.

In some embodiments, when the foldable display screen of the terminal is in the folded state, the video playback interface is displayed on at least one screen of the folded plurality of display screens; when the foldable display screen of the terminal is in the unfolded state, the video playback interface is displayed on the screen unfolded into a display screen. When the foldable display screen of the terminal is unfolded, the unfolded display screen is at least two screens or folded areas.

Step 902, when the foldable display screen is in the unfolded state, a display resolution in the unfolded display area of the foldable display screen is obtained. The display resolution includes a first resolution of a long side and a second resolution of a short side.

The unfolded display area is the area for displaying the video playback interface on the composite display when the foldable display screen is in an unfolded state.

The terminal obtains the display resolution in the unfolded display area of the foldable display screen when the foldable display screen is determined to be in an unfolded state, and the display resolution includes a first resolution of the long side and a second resolution of the short side. In the embodiment, the first resolution is a resolution of the long side formed after the display screen is unfolded, that is, a resolution of the width of the foldable display screen in the unfolded state in a horizontal direction; and the second resolution is a resolution of the short side formed after the display screen is unfolded, that is, a resolution of the height of the foldable display screen in the unfolded state in a vertical direction.

Step 903, the number of pixels occupied by the video playback area on the short side is calculated according to the video aspect ratio of the target video and the first resolution, wherein the number of pixels is smaller than the second resolution.

The terminal calculates the number of pixels occupied by the video playback area on the short side according to the video aspect ratio of the target video, such as the video aspect ratio of 16:9, and the first resolution, and the number of pixels is smaller than the second resolution, so that the pixels distributed on the short side are divided into two kinds of pixels when the target video is played.

Step 904, the short side is split into a first short side and a second short side according to the number of pixels, and a display area formed by the long side and the first short side is determined as the video playback area, and a display area formed by the long side and the second short side is determined as the auxiliary display area.

For example, in an embodiment, the video aspect ratio is 16:9 and the first resolution of the long side is 1600 pixels, the second resolution of the short side is 1200 pixels after the foldable display screen is unfolded. Under this situation, when the video is played, the long side of the display area (i.e., the width of the screen) should occupy 1600 pixels in order to leave no black edges. Then since the aspect ratio cannot be changed to ensure normal display of the video, the first short side of the display area should occupy 900 pixels, and then the second short side of the display area should occupy 1200−900=300 pixels. In this way, the display area formed by 1600 pixels*900 pixels at top of the display screen is determined as the video playback area. The display area formed by 1600 pixels*(1200-900) pixels at bottom of the display screen is determined as the auxiliary playback area. The terminal splits the short side into the first short side and the second short side according to the number of pixels. A display area formed by the first resolution of the long side and resolution of the first short side is determined as the video playback area, and a display area formed by the first resolution of the long side and resolution of the second short side is determined as the auxiliary display area.

In some embodiments, the video playback area and the auxiliary display area other than the video playback area are determined in the unfolded display area of the foldable display screen according to the video aspect ratio of the target video when the foldable display screen is switched from the folded state to the unfolded state.

When the folding display screen structure of the terminal is a structure combined by the main display screen and the auxiliary display screen, the terminal enters the video playback interface through the video application on the main display screen when the foldable display screen is in the unfolded state, and the video playback interface includes a target video playback area and controls for performing some operation on the played target video.

When the foldable display screen is switched from the folded state to the unfolded state, the folded auxiliary display screen and the main display screen are combined into one display screen, and the shape of the combined display screen is an approximately square shape. After the state of the foldable display screen is switched, the video playback interface is adaptively adjusted to an interface suitable for the unfolded state.

In the unfolded display area of the foldable display screen, according to the video aspect ratio of the target video, such as a video aspect ratio of 16:9, the video playback area and the auxiliary display area other than the video playback area are determined. The video playback area is located above the auxiliary display area, and the video playback area is for playing the target video. The auxiliary display area includes a control for performing some operation on the played target video, and the auxiliary display area is for operating the played target video.

An input box for the bullet screen and a virtual keyboard are displayed in the auxiliary display area in step 905.

Figure 10:
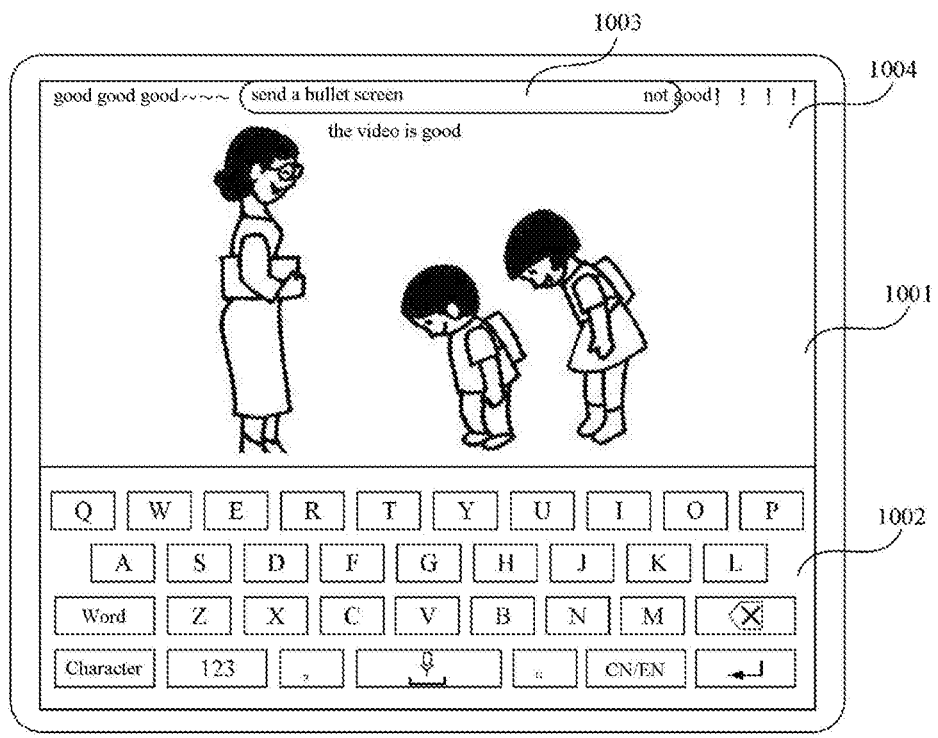
FIG. 10 is a schematic diagram showing an interface for performing the operation of inputting the bullet screen in an auxiliary display area according to some other embodiments.

In the auxiliary display area, there is a control for the operation of inputting the bullet screen. FIG. 10 is a schematic diagram showing an interface for performing the operation of inputting the bullet screen in the auxiliary display area 1002. The auxiliary display area 1002 is located below the video playback area 1001, and a virtual keyboard and an input box for the bullet screen 1003 are displayed in the auxiliary display area 1002. The input box for the bullet screen 1003 is configured to input a content of the bullet screen corresponding to the target video.

In some embodiments, the input box for the bullet screen 1003 is located at the peripheral side of the virtual keyboard, or the input box for the bullet screen 1003 is located in the bullet screen display area 1004. FIG. 10 shows the case where the input box for the bullet screen 1003 is located in the bullet screen display area 1004. The position of the input box for the bullet screen 1003 is not specifically limited in this embodiment.

Step 906, a playback progress bar of the target video is displayed in the auxiliary display area, and at least one recommended play node is displayed on the playback progress bar.

Figure 11:
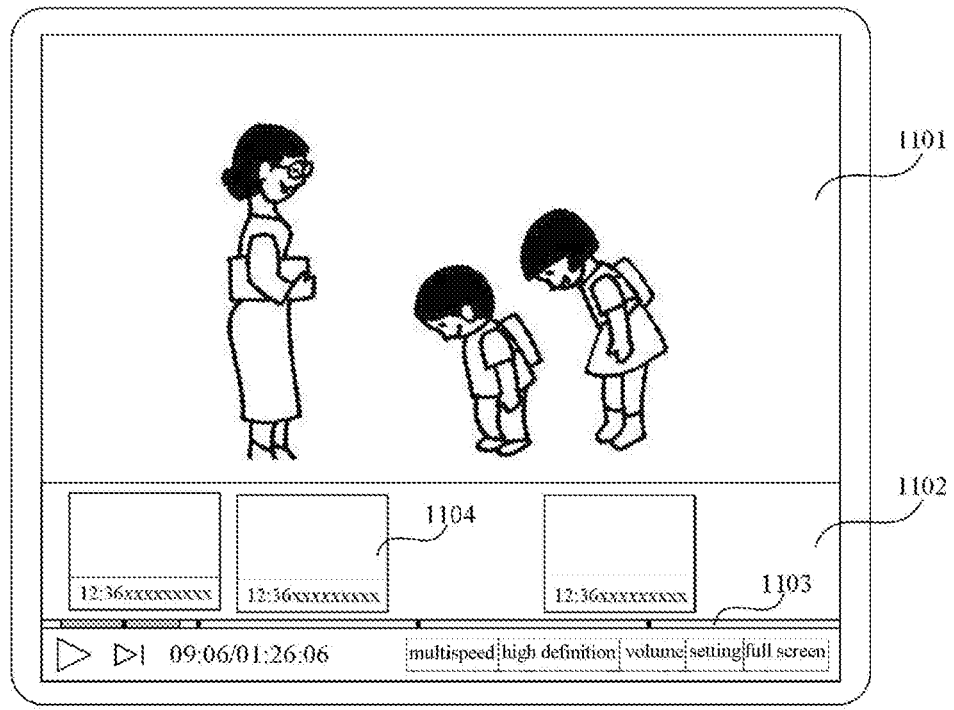
FIG. 11 is a schematic diagram showing an interface in which a playback progress bar is displayed in an auxiliary display area according to some other embodiments.
Figure 12:
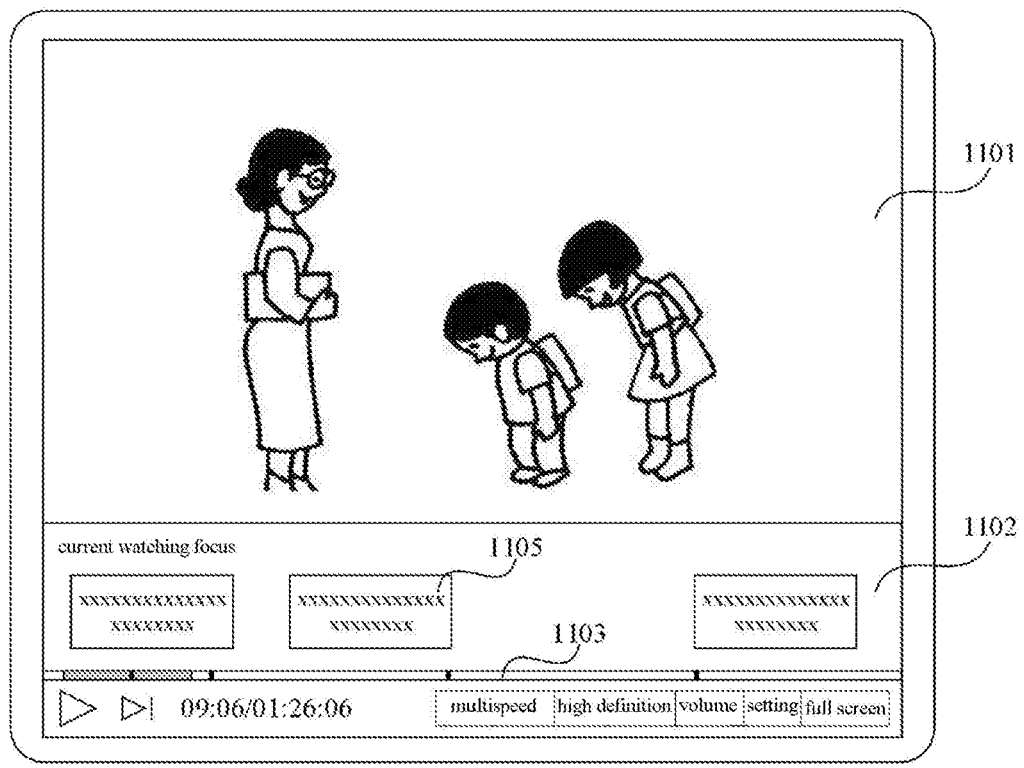
FIG. 12 is a schematic diagram showing an interface in which a playback progress bar is displayed in an auxiliary display area according to some other embodiments.

In the auxiliary display area, there is a playback progress bar, and the playback progress bar is dragged to realize quick selection of the highlight. FIGS. 11 and 12 schematically show schematic views of an interface in which the playback progress bar 1103 is displayed in the auxiliary display area 1101. The auxiliary display area 1102 is located below the video playback area 1101, and the playback progress bar 1103 of the target video is displayed in the auxiliary display area 1102. At least one recommended play node is displayed on the playback progress bar 1103, the recommended play node is for indicating the location of the highlight of the target video. The user quickly locates the highlights of the target video according to the location of the recommended play node.

A video screen preview corresponding to the play node is displayed at a peripheral side of the playback progress bar in step 907.

When the target video is playing, the playback progress bar displays a play node for indicating the current playback process of the target video. In the auxiliary display area, the video screen preview corresponding to the play node is displayed at a peripheral side of the playback progress bar, and the user can know the subsequent content of the target video through the video screen preview, and quickly select the location he/she wants to watch according to the video screen preview.

In an optional implementation manner, as shown in FIG. 11, a video screen preview 1104 corresponding to the play node is displayed at the peripheral side of the playback progress bar 1103, and the video screen preview 1104 displays the screen content of the subsequent content of the target video.

In another optional implementation manner, as shown in FIG. 12, a video prompt text 1105 corresponding to the play node is displayed at the peripheral side of the playback progress bar 1103, and the video prompt text 1105 displays the text content of the subsequent content of the target video.

In some embodiments, the display manner of the subsequent content of the target video corresponding to the play node at the peripheral side of the playback progress bar includes at least one of the foregoing two manners, and the display manner includes but is not limited to the foregoing two manners. In this embodiment, the display manner of the subsequent content of the target video corresponding to the playback node at the peripheral side of the playback progress bar is not limited.

A shortcut button control is displayed in the auxiliary display area in step 908.

In the auxiliary display area, there is a shortcut button control. The shortcut button control is for performing operations on the played target video. The shortcut button control includes at least one of a cache button, a projection screen button, a VR button, a button for setting the bullet screen display mode, a small window play button, a screen size button, a timed off button, an automatic skip beginning and ending button, a brightness adjustment button, a multispeed play button, or a share button.

Figure 13:
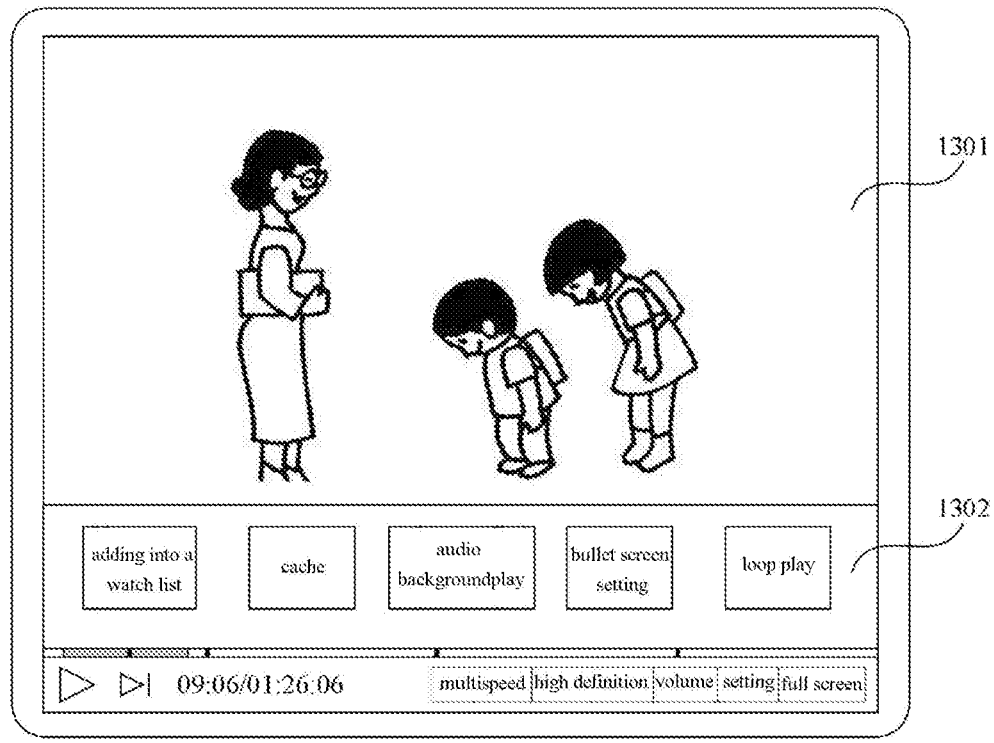
FIG. 13 is a schematic diagram showing an interface in which a shortcut button control is displayed in an auxiliary display area according to some other embodiments.
Figure 14:
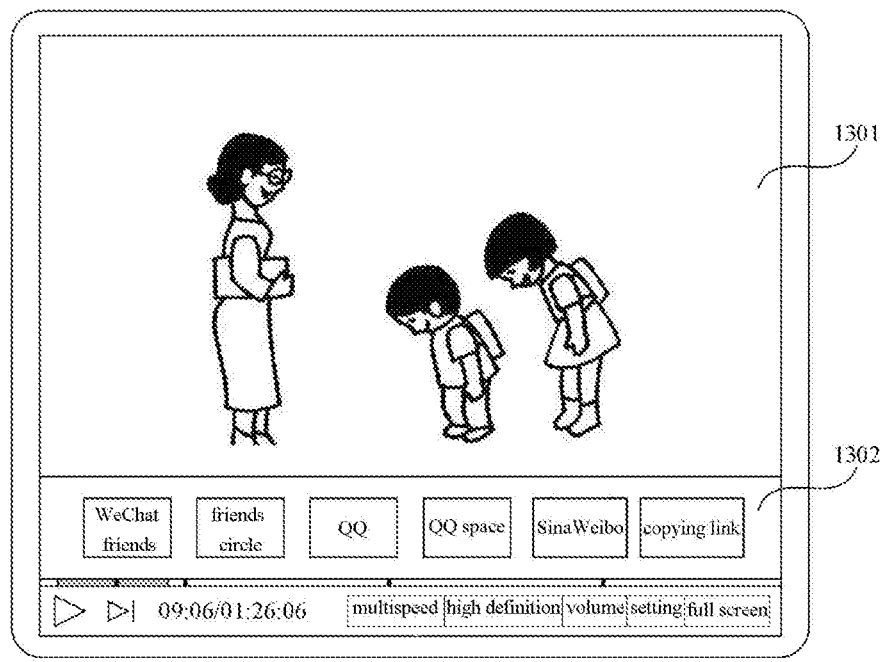
FIG. 14 is a schematic diagram showing an interface in which a shortcut button control is displayed in an auxiliary display area according to some other embodiments.

FIGS. 13 to 14 schematically show schematic views of an interface in which a shortcut button control is displayed in the auxiliary display area 1302. The auxiliary display area 1302 is located below the video playback area 1301, and a shortcut button control is displayed in the auxiliary display area 1302. The user can perform some operation on the played target video by clicking the shortcut button control.

In an optional implementation manner, as shown in FIG. 13, the shortcut button control displayed in the auxiliary display area 1302 is schematically illustrated. The shortcut button control includes: a button for adding into a watch list, a cache button, an audio background play button, a bullet screen setting button, a loop play button, etc.

In another optional implementation manner, as shown in FIG. 14, a sharing platform corresponding to the sharing button displayed in the auxiliary display area 1302 is schematically illustrated, and the sharing platform includes at least one of WeChat, friend circle, QQ, QQ space, Sina-Weibo, and screencast sharing.

As such, in the method provided by the embodiment of the present application, when the foldable display screen is in an unfolded state, a video playback area and an auxiliary display area other than the video playback area are determined in an unfolded display area of the foldable display screen according to a video aspect ratio of the target video, and in the auxiliary display area, an auxiliary control related to playing the target video is displayed.

In the terminal where the foldable display screen is in the unfolded state, the video playback area for playing the target video is separated from the auxiliary display area for performing operations on the target video, so that the target video can still be played normally when the target video is operated, thereby realizing that the user can perform operations while watching the video to ensure the watching effect.

The method provided by the embodiment of the present application determines the first short side and the second short side by dividing the second resolution of the short side of the foldable display screen in an unfolded state, so that the display area formed by the first short side and the long side is determined as a video playback area, and the display area formed by the second short side and the long side is determined as the auxiliary display area, so that the video playback area is separated from the auxiliary display area, and when the user performs some operation in the auxiliary display area, the target video is not affected, achieving a good viewing effect of the user.

In the method provided by the embodiment of the present application, when the foldable display screen is in the unfolded state, the main display screen and the auxiliary display screen are combined into a large display screen, and under the premise of ensuring that the target video is playing without distortion, the auxiliary display area is disposed below the video playback area. Some operation is performed on the target video in the auxiliary display area without affecting the normal playback of the target video.

In the method provided by the embodiment of the present application, an auxiliary control related to playing the target video is displayed in the auxiliary display area, thereby achieving at least one of operations of inputting a bullet screen, dragging a progress bar, and setting a video.

The following is embodiments of the device of the present application, which may be used to implement embodiments of the method of the present application. For details not disclosed in the embodiments of the device of the present application, please refer to the embodiments of the method of the present application.

Figure 15:
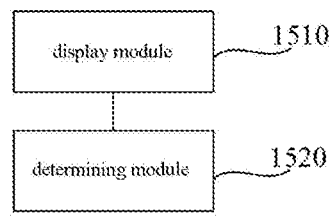
FIG. 15 is a schematic structural diagram showing an operation device of playing a video according to some other embodiments.

FIG. 15 is a schematic structural diagram of an operation device when playing a video according to some embodiments. The device is applied to a terminal having a foldable display screen, and the folding structure of the terminal having the foldable display screen is the structure as shown in FIGS. 5-7, the device includes:

a display module 1510, configured to display a video playback interface for a target video; and a determining module 1520, configured to determine a video playback area and an auxiliary display area other than the video playback area in an unfolded display area of the foldable display screen according to a video aspect ratio of the target video when the foldable display screen is in an unfolded state.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The display module 1510 is configured to display an auxiliary control related to playing the target video in the auxiliary display area.

Figure 16:
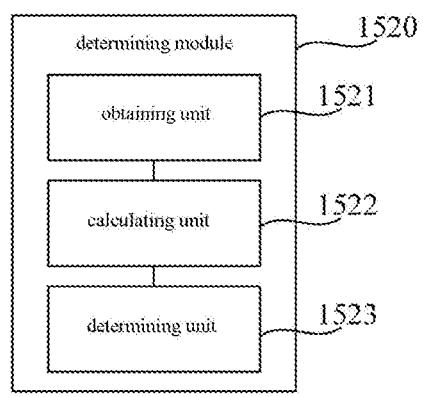
FIG. 16 is a schematic structural diagram of a determining module according to some embodiments.

In some embodiments, as shown in FIG. 16, the determining module 1520 includes:

an obtaining unit 1521, configured to obtain a display resolution in the unfolded display area of the foldable display screen, wherein the display resolution includes a first resolution of a long side and a second resolution of a short side;

a calculating unit 1522, configured to calculate the number of pixels occupied by the video playback area on the short side according to the video aspect ratio of the target video and the first resolution, wherein the number of pixels is smaller than the second resolution; and a determining unit 1523, configured to split the short side into a first short side and a second short side according to the number of pixels, and determine a display area formed by the long side and the first short side as the video playback area and determine a display area formed by the long side and the second short side as the auxiliary display area.

In some embodiments, the display module 1510 is configured to display the video playback interface for the target video on a main display screen of the foldable display screen when the foldable display screen is in a folded state.

The determining module 1520 is configured to determine the video playback area and the auxiliary display area other than the video playback area in the unfolded display area of the foldable display screen according to the video aspect ratio of the target video when the foldable display screen is switched from the folded state to the unfolded state.

In an optional implementation manner, the display module 1510 is configured to display an input box for the bullet screen and a virtual keyboard in the auxiliary display area; the input box for the bullet screen is configured to input a content of the bullet screen corresponding to the target video.

In another optional implementation manner, the display module 1510 is configured to display a playback progress bar of the target video in the auxiliary display area, and at least one recommended play node is displayed on the playback progress bar. The display module 1510 is configured to display a video screen preview corresponding to the play node at a peripheral side of the playback progress bar.

In another optional implementation manner, the display module 1510 is configured to display a shortcut button control in the auxiliary display area; the shortcut button control includes at least one of a cache button, a projection screen button, a VR button, a button for setting the bullet screen display mode, a small window play button, a screen size button, a timed off button, an automatic skip beginning and ending button, a brightness adjustment button, a multi-speed play button, or a share button.

It should be noted that, when the device provided by the foregoing embodiment performs the operation of playing video, the division of each functional module described above is only illustrated. In actual applications, the above function assignments can be completed by different functional modules according to actual needs, that is, the contents structures of the device are divided into different functional modules to complete all or part of the functions described above.

With regard to the device in the above embodiments, the specific manner in which the respective modules perform the operations has been described in detail in the embodiment relating to the method, and will not be explained in detail herein.

Various embodiments of the present application can have one or more of the following advantages:

when the foldable display screen is in the unfolded state, the video playback area and the auxiliary display area other than the video playback area are determined in the unfolded display area of the foldable display screen according to the video aspect ratio of the target video, and in the auxiliary display area, the auxiliary control related to playing the target video is displayed. In the terminal in which the foldable display screen is in the unfolded state, the video playback area playing the target video is separated from the auxiliary display area for operating the target video, so that the target video can still be played normally when the target video is operated, thereby realizing that the user can perform the operation which watching the video to ensure the watching effect.

Figure 17:
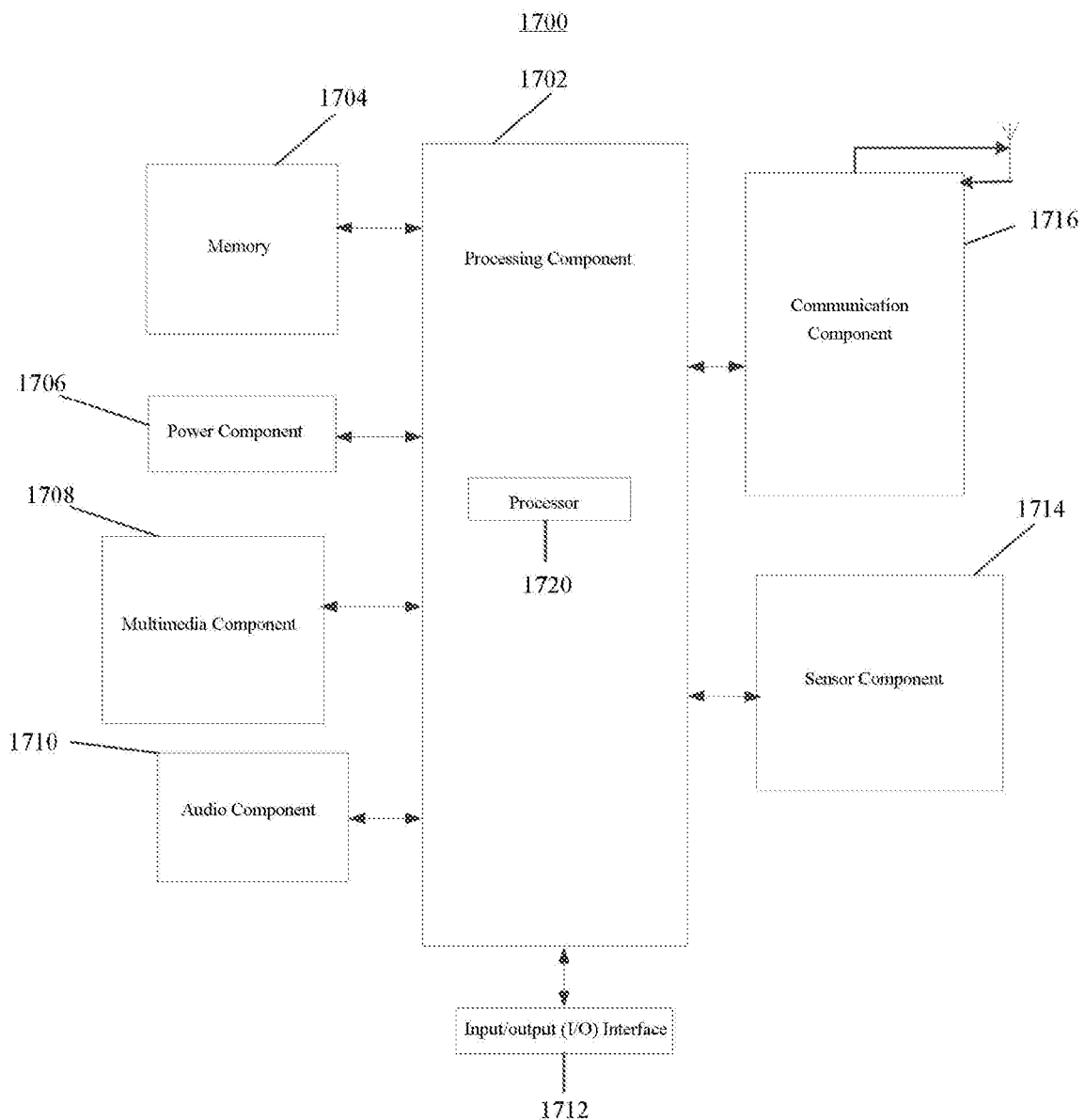
FIG. 17 is a block diagram showing a device for a terminal having a foldable display screen according to some embodiments.

FIG. 17 is a block diagram showing a device 1700 for a terminal having a foldable display screen according to some embodiments. For example, the device 1700 can be a terminal, and can be specifically a mobile phone, a computer, a digital broadcast terminal, a message transceiver, a gaming console, a tablet device, a medical device, a fitness device, a personal digital assistant, or the like.

Referring to FIG. 17, the device 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls the overall operations of the device 1700, such as the operations associated with display, telephone calls, data communications, camera operations, and recording operations. The processing component 1702 can include one or more processors 1720 to execute instructions to perform all or part of the steps in the above described methods. Moreover, the processing component 1702 can include one or more modules to facilitate the interaction between the processing component 1702 and other components. For example, the processing component 1702 can include a multimedia module to facilitate the interaction between the multimedia component 1608 and the processing component 1702.

The memory 1704 is configured to store various types of data to support the operation of the device 1700. Examples of such data include instructions for any application or method operated on device 1700, such as the contact data, the phone book data, messages, pictures, videos, and the like. The memory 1704 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the device 1700. The power component 1706 can include a power management system, one or more power sources, and other components associated with the generation, management, and distribution of power in the device 1700.

The multimedia component 1708 includes a screen providing an output interface between the device 1700 and the user. In some embodiments, the screen can include a liquid crystal display (LCD) and a touch panel (TP). In some embodiments, the screen can be other types of displays, such as organic light-emitting diode (OLED) displays.

If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. When the device 1700 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1710 is configured to output and/or input an audio signal. For example, the audio component 1710 includes a microphone (MIC) configured to receive an external audio signal when the device 1700 is in an operation mode, such as a call mode, a recording mode, and a voice recognition mode. The received audio signal may be further stored in the memory 1704 or transmitted via the communication component 1716. In some embodiments, the audio component 1710 also includes a speaker for outputting the audio signal.

The I/O interface 1712 provides an interface between the processing component 1702 and peripheral interface modules, such as a keyboard, a click wheel, buttons, and the like. These buttons may include, but are not limited to, a home button, a volume button, a starting button, and a locking button.

The sensor component 1714 includes one or more sensors for providing status assessments of various aspects of the device 1700. For example, the sensor component 1714 can detect an open/closed status of the device 1700, relative positioning of components, such as the display and the keypad of the device 1700. The sensor component 1714 can also detect a change in position of one component of the device 1700 or the device 1700, the presence or absence of user contact with the device 1700, an orientation, or an acceleration/deceleration of the device 1700, and a change in temperature of the device 1700. The sensor component 1714 can include a proximity sensor configured to detect the presence of nearby objects without any physical contact. The sensor component 1714 can also include a light sensor, such as a CMOS or CCD image sensor, configured to use in imaging applications. In some embodiments, the sensor component 1714 can also include an accelerometer sensor, a gyroscope sensor, a magnetic sensor, a pressure sensor, or a temperature sensor.

The communication component 1716 is configured to facilitate wired or wireless communication between the device 1700 and other devices. The device 1700 can access a wireless network based on a communication standard, such as Wi-Fi, 2G, 3G, 4G or 5G, or a combination thereof. In some embodiments, the communication component 1716 receives broadcast signals or broadcast associated information from an external broadcast management system via a broadcast channel. In some embodiments, the communication component 1716 also includes a near field communication (NFC) module to facilitate short-range communications.

In some embodiments, the device 1700 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components to perform the above method.

In some embodiments, there is also provided a non-transitory computer-readable storage medium including instructions, such as a memory 1704 including instructions executable by the processor 1720 of the device 1700 to perform the above described method. For example, the non-transitory computer readable storage medium may be a ROM, a random-access memory (RAM), a CD-ROM, a magnetic tape, a floppy disc, and an optical data storage device.

A non-transitory computer-readable storage medium, when instructions in the storage medium are executed by a processor of device 1700, enables the device 1700 to perform an operation method of playing a video. The method includes:

displaying a video playback interface for a target video; determining a video playback area and an auxiliary display area other than the video playback area in an unfolded display area of the foldable display screen according to a video aspect ratio of the target video when the foldable display screen is in an unfolded state; and in the auxiliary display area, displaying an auxiliary control related to playing the target video.

In some embodiments, there is also provided a computer-readable storage medium, which can be a non-transitory computer-readable storage medium having stored therein a computer program, when the stored computer program is executed by the processing component, the operation method of playing the video provided by the above embodiment of the present application can be implemented.

In some embodiments, there is also provided a computer program product, wherein at least one instruction, at least one program, a code set, or an instruction set is stored in the program product. The at least one instruction, the at least one program, the code set, or the instruction set instructions is loaded and executed by the processor to implement an operation method of playing a video performed by the terminal as shown in the method embodiment above.

It should be understood that "a plurality" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects is an "or" relationship.

In the present disclosure, it is to be understood that the terms "lower," "upper," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on," a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

Implementations of the subject matter and the operations described in this disclosure can be implemented with hardware such as digital electronic circuitry or processing circuits, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded or stored on one or more non-transitory computer-readable storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An operation method of playing a video, applied to a terminal having a foldable display screen, the method comprising:
    displaying a video playback interface for a target video;
    determining a video playback area, and an auxiliary display area other than the video playback area, in an unfolded display area of the foldable display screen, according to a video aspect ratio of the target video when the foldable display screen is in an unfolded state;
    displaying an auxiliary control related to playing the target video in the auxiliary display area,
    wherein the displaying a video playback interface for a target video comprises:
    displaying the video playback interface for the target video on a main display screen of the foldable display screen when the foldable display screen is in a folded state;
    wherein the determining a video playback area and an auxiliary display area other than the video playback area in an unfolded display area of the foldable display screen according to a video aspect ratio of the target video when the foldable display screen is in an unfolded state comprises:
    determining the video playback area and the auxiliary display area other than the video playback area in an unfolded display area of the foldable display screen according to the video aspect ratio of the target video in response to the foldable display screen being switched from the folded state to the unfolded state;
    wherein the displaying an auxiliary control related to playing the target video in the auxiliary display area comprises:
    displaying an input box for a bullet screen and a virtual keyboard in the auxiliary display area, wherein the input box for the bullet screen is configured to input a content of the bullet screen corresponding to the target video
    wherein the determining a video playback area and an auxiliary display area other than the video playback area in an unfolded display area of the foldable display screen according to a video aspect ratio of the target video comprises:
    obtaining a display resolution of the unfolded display area of the foldable display screen, wherein the display resolution comprises a first resolution of a long side and a second resolution of a short side, wherein the first resolution is a width of the foldable display screen and the second resolution is a height of the foldable display screen;
    calculating a number of pixels occupied by the video playback area on the short side according to the video aspect ratio of the target video and the first resolution, wherein the number of pixels is smaller than the second resolution; and
    splitting the short side into a first short side and a second short side according to the number of pixels, and determining a display area formed by the long side and the first short side as the video playback area, and determining a display area formed by the long side and the second short side as the auxiliary display area.

2. The method according to claim 1, wherein the displaying an auxiliary control related to playing the target video in the auxiliary display area comprises:
    displaying a playback progress bar of the target video in the auxiliary display area, wherein at least one recommended play node is displayed on the playback progress bar; and
    displaying a video screen preview corresponding to the play node at a peripheral side of the playback progress bar.

3. An operating device for playing a video, the operating device being a terminal with a foldable display screen, the device comprising:
    a processor;
    a memory for storing executable instructions of the processor;
    wherein the processor is configured to:
    display a video playback interface fora target video;

determine a video playback area and an auxiliary display area other than the video playback area in an unfolded display area of the foldable display screen according to a video aspect ratio of the target video when the foldable display screen is in an unfolded state;

display an auxiliary control related to playing the target video in the auxiliary display area;

wherein the displaying a video playback interface for a target video comprises:

displaying the video playback interface for the target video on a main display screen of the foldable display screen when the foldable display screen is in a folded state;

wherein the determining a video playback area and an auxiliary display area other than the video playback area in an unfolded display area of the foldable display screen according to a video aspect ratio of the target video when the foldable display screen is in an unfolded state comprises:

determining the video playback area and the auxiliary display area other than the video playback area in an unfolded display area of the foldable display screen according to the video aspect ratio of the target video in response to the foldable display screen being switched from the folded state to the unfolded state;

wherein the displaying an auxiliary control related to playing the target video in the auxiliary display area comprises:

displaying an input box for a bullet screen and a virtual keyboard in the auxiliary display area, wherein the input box for the bullet screen is configured to input a content of the bullet screen corresponding to the target video wherein the determining a video playback area and an auxiliary display area other than the video playback area in an unfolded display area of the foldable display screen according to a video aspect ratio of the target video comprises:

obtaining a display resolution of the unfolded display area of the foldable display screen, wherein the display resolution comprises a first resolution of a long side and a second resolution of a short side, wherein the first resolution is a width of the foldable display screen and the second resolution is a height of the foldable display screen;

calculating a number of pixels occupied by the video playback area on the short side according to the video aspect ratio of the target video and the first resolution, wherein the number of pixels is smaller than the second resolution; and splitting the short side into a first short side and a second short side according to the number of pixels, and determining a display area formed by the long side and the first short side as the video playback area, and determining a display area formed by the long side and the second short side as the auxiliary display area.

4. The device according to claim 3, wherein:

the processor is further configured to display a playback progress bar of the target video in the auxiliary display area, and at least one recommended play node is displayed on the playback progress bar; and the processor is further configured to display a video screen preview corresponding to the play node at a peripheral side of the playback progress bar.

5. A terminal, wherein the terminal comprises:

a processor;

a memory for storing executable instructions of the processor;

wherein the processor is configured to:

display a video playback interface fora target video;

determine a video playback area and an auxiliary display area other than the video playback area in an unfolded display area of a foldable display screen according to a video aspect ratio of the target video when the foldable display screen is in an unfolded state; and display an auxiliary control related to playing the target video in the auxiliary display area;

wherein the displaying a video playback interface for a target video comprises:

displaying the video playback interface for the target video on a main display screen of the foldable display screen when the foldable display screen is in a folded state;

wherein the determining a video playback area and an auxiliary display area other than the video playback area in an unfolded display area of the foldable display screen according to a video aspect ratio of the target video when the foldable display screen is in an unfolded state comprises:

determining the video playback area and the auxiliary display area other than the video playback area in an unfolded display area of the foldable display screen according to the video aspect ratio of the target video in response to the foldable display screen being switched from the folded state to the unfolded state;

wherein the displaying an auxiliary control related to playing the target video in the auxiliary display area comprises:

displaying an input box for a bullet screen and a virtual keyboard in the auxiliary display area, wherein the input box for the bullet screen is configured to input a content of the bullet screen corresponding to the target video wherein the determining a video playback area and an auxiliary display area other than the video playback area in an unfolded display area of the foldable display screen according to a video aspect ratio of the target video comprises:

obtaining a display resolution of the unfolded display area of the foldable display screen, wherein the display resolution comprises a first resolution of a long side and a second resolution of a short side, wherein the first resolution is a width of the foldable display screen and the second resolution is a height of the foldable display screen;

calculating a number of pixels occupied by the video playback area on the short side according to the video aspect ratio of the target video and the first resolution, wherein the number of pixels is smaller than the second resolution; and splitting the short side into a first short side and a second short side according to the number of pixels, and determining a display area formed by the long side and the first short side as the video playback area, and determining a display area formed by the long side and the second short side as the auxiliary display area.

6. A non-transitory computer-readable storage medium having stored thereon a computer program, wherein when executed by a processor, the computer program implements the operation method of playing a video according to claim 1.

* * * * *